(12) United States Patent
Ramos et al.

(10) Patent No.: US 8,520,195 B2
(45) Date of Patent: Aug. 27, 2013

(54) METHOD AND SYSTEM FOR ESTIMATING FLUID LEAK FLOW RATES USING DISTRIBUTED OPTICAL FIBER SENSORS

(75) Inventors: Rogerio Tadeu Ramos, Eastleigh (GB); Andrew Strong, Romsey (GB); Gareth Lees, Romsey (GB)

(73) Assignee: Schlumberger Technology Corporation, Rosharon, TX (US)

( * ) Notice: Subject to any disclaimer, the term of this patent is extended or adjusted under 35 U.S.C. 154(b) by 349 days.

(21) Appl. No.: 12/744,112

(22) PCT Filed: Nov. 26, 2008

(86) PCT No.: PCT/US2008/085042
§ 371 (c)(1),
(2), (4) Date: Aug. 23, 2010

(87) PCT Pub. No.: WO2009/070769
PCT Pub. Date: Jun. 4, 2009

(65) Prior Publication Data
US 2010/0315630 A1    Dec. 16, 2010

Related U.S. Application Data

(63) Continuation-in-part of application No. PCT/US2009/048878, filed on Jun. 26, 2009.

(60) Provisional application No. 60/990,147, filed on Nov. 26, 2007.

(51) Int. Cl.
*G01N 21/00* (2006.01)
(52) U.S. Cl.
USPC .......................................................... 356/72

(58) Field of Classification Search
USPC ............................................ 356/72–73, 301
See application file for complete search history.

(56) References Cited

U.S. PATENT DOCUMENTS

| 4,455,863 A | 6/1984 | Huebler et al. |
| 5,117,676 A | 6/1992 | Chang |
| 5,416,724 A | 5/1995 | Savic |
| 5,918,641 A | 7/1999 | Hardy et al. |

(Continued)

OTHER PUBLICATIONS

Smith, P, et al, "Optical Fibre Continuous Temperature Sensing of Trace Heating Systems," BICC Thermoheat Jul. 1996, pp. 5/1-5/6, XP003029254.

(Continued)

*Primary Examiner* — Tarifur Chowdhury
*Assistant Examiner* — Abdullahi Nur
(74) *Attorney, Agent, or Firm* — Brandon S. Clark

(57) ABSTRACT

A leak detection system and method is provided for a structure having a first barrier to a first fluid and a second barrier to a second fluid, the first barrier and the second barrier defining a space therebetween. The system includes at least one sensor, such as a fiber optic sensor, placed in the space and configured to detect presence of the first fluid or the second fluid in the space due to a fluid leak in the first barrier or the second barrier. The fiber optic sensor may further be configured to measure one or more characteristics of an acoustic emission caused by the leak, and the system and method may be able to estimate the orifice diameter of the fluid leak based on the measured one or more characteristics, and to calculate a leak rate based on the estimated orifice diameter.

38 Claims, 5 Drawing Sheets

(56) References Cited

U.S. PATENT DOCUMENTS

| | | | |
|---|---|---|---|
| 5,974,862 | A | 11/1999 | Lander et al. |
| 6,618,153 | B2 | 9/2003 | Lin et al. |
| 6,725,705 | B1 | 4/2004 | Huebler et al. |
| 7,296,480 | B2 | 11/2007 | De Aquino |
| 7,318,335 | B2 | 1/2008 | Olesen et al. |
| 2004/0027560 | A1 | 2/2004 | Fredin et al. |
| 2004/0067003 | A1* | 4/2004 | Chliaguine et al. ............ 385/13 |
| 2006/0225507 | A1 | 10/2006 | Paulson |
| 2007/0131297 | A1 | 6/2007 | Spaolonzi et al. |

OTHER PUBLICATIONS

D. Begg, "A Fibre Optic Sensor for Flexible Pipeline and Riser Integrity Monitoring."

Page from Wayback Machine website showing public availability of NPL1.

* cited by examiner

METHOD AND SYSTEM FOR ESTIMATING FLUID LEAK FLOW RATES USING DISTRIBUTED OPTICAL FIBER SENSORS

CROSS REFERENCE TO RELATED APPLICATIONS

The invention and application are related to and are a continuation-in-part of PCT Application Serial No. PCT/US2009/048878 of Strong et al., entitled "METHOD AND SYSTEM FOR ESTIMATING FLUID LEAK FLOW RATES USING DISTRIBUTED OPTICAL FIBER SENSORS," filed on Jun. 26, 2009, which in turn claims the benefit of priority from Great Britain Provisional Patent Application Serial No. 0811705.3 of Strong et al., entitled "METHOD AND SYSTEM FOR ESTIMATING FLUID LEAK FLOW RATES USING DISTRIBUTED OPTICAL FIBRE SENSORS," filed on Jun. 26, 2008. This invention and application are related to and are further a continuation-in-part of PCT/US2008/085042 of Ramos, entitled "OPTICAL FIBER LEAK, RUPTURE AND IMPACT DETECTION SYSTEM AND METHOD," filed on Nov. 26, 2008, which is related to and claims the benefit of priority from U.S. Provisional Patent Application Ser. No. 60/990,147 of Van Nuffelen et al., entitled "LEAK DETECTION AND LEAK, RUPTURE OR IMPACT DETECTION ON FLEXIBLE RISER," filed on Nov. 26, 2007. The entire contents of all of the aforementioned applications are hereby incorporated by reference herein.

FIELD OF THE INVENTION

The invention generally relates to methods and systems for detecting leaks, ruptures or impacts on a structure, and more particularly to a system and method employing optical fibers for detecting leaks, ruptures or impacts on a structure, and for estimating fluid leak flow rates.

BACKGROUND

The complexity of structures, for example, used in oil and gas subsea exploration is increasing to satisfy the many requirements in terms of thermal behavior, geometry, multiple fluid flows, flexibility and mechanical characteristics. For example, some umbilicals or risers can be used to connect wells or facilities at the sea bed to, for example, floating facilities at the sea surface. Further examples of such structures include manifolds, separators and control units. It is desirable to monitor such connections in order to prevent structural failure due to fatigue, corrosion, erosion or blockage, which can be caused by the deposition of parts of the flow components (e.g., such as wax, hydrates, scales, asphaltenes, etc.).

Damage to such structures also can be due to human activity, such as fishing or laying and removal of anchors. Damage can also be the result of excessive stresses or shocks during transportation or deployment. Manufacturing defects can also compromise the quality of such structures.

For such reasons, leaks can develop in localized parts of such structures. Often such a leak is detected after it has become large, leading to unplanned repairs that can take a long time, as equipment, material and personnel need to be mobilized on short notice. Locating the leak is also an important issue. Sometimes the leak cannot be located with a simple visual inspection, requiring the replacement of long sections of the structure. For example, leaks can be of seawater into the structure, which can promote problems, such as corrosion or contamination of hydraulic lines, or leakage of oil or gas out of the structure.

SUMMARY OF THE INVENTION

The above and other needs and problems are addressed by the exemplary embodiments of the present invention, which provide a novel leak, rupture or impact detection system (which may also be referred to as "apparatus") and method that employ one or more sensing systems, which can include optical fibers, as part of a structure or in close proximity to the structure to detect and locate a leak, rupture or impact therein. The structure may be at least partially an underwater or an underground structure. The terms "sensing systems" and "sensors" are used interchangeably herein. The sensors can be based on various principles, such as the detection of water, humidity, oil, gas, and the like. The sensors can be distributed (e.g., using optical time or frequency domain reflectometry) or multipoint sensors and can include optical fiber sensors, and the like. A sensor which detects a change in attenuation or index of refraction of an optical fiber also can be employed. The location of the leak, rupture or impact can be detected using optical time domain reflectometer (OTDR) or frequency domain techniques. The sensor can be based on Brillouin, Raman or Rayleigh scattering, or a fiber Bragg grating, and the like. The optical fiber can be imbedded or placed in close proximity to a material which is affected by the presence of fluid (e.g., water, oil, gas, etc.) to be detected. Such material can be applied as a coating to the fiber or as a rod twisted with the fiber or as a rod having the fiber wrapped around the rod. Such material can swell, or shrink, or dissolve, or break down or have any other suitable characteristics, which undergo a change in the presence of such a fluid. Such change can affect the optical fiber by increasing or reducing strain on the fiber or chemically reacting with the fiber or an intermediate material thereof and which also can be a material that can swell, or shrink, or dissolve, or break down or have any other suitable characteristics, which undergo a change in the presence of such a fluid. The intermediate material can be the same as or different than the material in which the optical fiber is embedded or can be placed in close proximity thereto. The material affected by the presence of fluid can be any suitable polymer, metal, ceramic, gel, or combination thereof, and the like.

In one embodiment, the sensor or sensors can be imbedded into the structure, e.g., a flexible pipe, for example, during a manufacturing process thereof, including processes, such as extrusion, pulltrusion or laying of the sensor on the surface of the polymer as it cures, and the like. Such flexible pipes can include any suitable pipes e.g., flexible riser or umbilical, used, for example, for subsea, marine applications, and the like, such as subsea oil and gas exploration and production, and the like.

Accordingly, in an exemplary aspect of the present invention there is provided a leak detection system for a structure and method thereof, including a structure having a first barrier to a first fluid and a second barrier to a second fluid, the first barrier and the second barrier defining a space therebetween; and at least one sensor, placed in the space, and configured to detect presence of the first fluid or the second fluid in the space due to a fluid leak in the first barrier or the second barrier. The first barrier may be an outer shell of the structure in contact with sea water, and the sensor may detect a leakage of sea water between the first and second barriers. At least one of the first barrier or the second barrier may be one of a polymer layer, a metal layer, an insulation layer, a pipe, or a buoyancy layer.

In another exemplary aspect of the invention, the at least one sensor comprises a fiber optic sensor configured to measure one or more characteristics of an acoustic emission arising as a result of a leak, such as a fluid leak. The system and method are configured to estimate the orifice diameter of the fluid leak based on the measured one or more characteristics, and to calculate a leak rate based on the estimated orifice diameter.

In a further exemplary aspect of the invention there is provided a leak detection method for a structure having a first barrier to a first fluid and a second barrier to a second fluid, the first barrier and the second barrier defining a space therebetween, the method including placing at least one sensor in the space to detect presence of the first fluid or the second fluid in the space due to a leak in the first barrier or the second barrier; and detecting with the sensor the presence of the first fluid or the second fluid in the space due to a leak in the first barrier or the second barrier.

In yet another exemplary aspect of the invention there is provided a leak detection method for a structure having a first barrier to a first fluid and a second barrier to a second fluid, the first barrier and the second barrier defining a space therebetween, the method including placing at least one sensor in the space to detect presence of the first fluid or the second fluid in the space due to a leak in the first barrier or the second barrier; and generating a signal that indicates the presence of the first fluid or the second fluid in the space due to a leak in the first barrier or the second barrier.

Still other aspects, features, and advantages of the present invention are readily apparent from the entire description thereof, including the figures, which illustrates a number of exemplary embodiments and implementations. The invention is also capable of other and different embodiments, and its several details can be modified in various respects, all without departing from the spirit and scope of the invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION

Various embodiments and aspects of the invention will now be described in detail with reference to the accompanying figures. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, as well as equivalents, and additional subject matter not recited. Further, whenever a composition, a group of elements or any other expression is preceded by the transitional phrase "comprising," "including", "containing," "having" or "involving", it is understood that it is also contemplated that the same composition, the group of elements or any other expression can also include transitional phrases "consisting essentially of," "consisting," or "selected from the group of consisting of," preceding the recitation of the composition, the group of elements or any other expression.

The structures which can be the subject of this invention can include any suitable structures, wherein detection of leaks is needed, such as any subsea pipe, subsea structure, e.g., a flexible pipe, such as a flexible riser or an umbilical. Such structures are known in the art, see, e.g., U.S. Pat. Nos. 7,296,480 and 5,918,641, incorporated herein by reference.

Figure 1:
FIG. 1 illustrates an exemplary structure in the form of a flexible pipe such as a pipe that can be used for subsea oil and gas exploration.

Referring now to the drawings, wherein like reference numerals designate identical or corresponding parts throughout the several views, and more particularly to FIG. 1 thereof, there is illustrated an exemplary structure 100, for example, in the form of a flexible pipe or riser used in subsea applications. In FIG. 1, element 1 is an internal reinforcement layer (e.g., made of metal, etc.), while elements 3 and 4 are external reinforcement layers (e.g., made of metal, etc.). Element 2 is a layer used to provide fluid isolation from fluids traveling inside of the structure 100 and element 5 is an outer protection shell for fluid isolation from fluids outside of the structure 100. The layers 2 and 5 can be made of any suitable material, such as polymers, and the like. Accordingly, the various layers or barriers can include any suitable polymer layers, metal layers, insulation layers, pipes, buoyancy layers, and the like, of the structure 100.

Figure 2A:
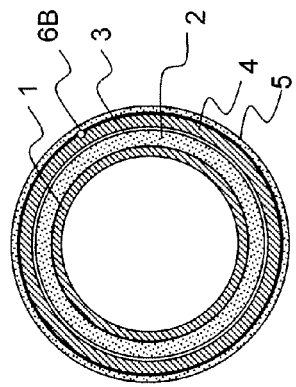
FIGS. 2A-2B illustrate exemplary placements for an exemplary leak detection sensor for the structure of FIG. 1.
Figure 2B:
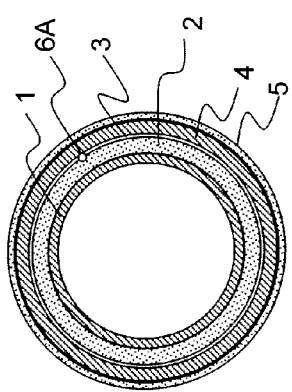

FIGS. 2A-2B show possible placement for exemplary sensors 6A and 6B (either one of each or both can include, e.g., an optical fiber) in the flexible pipe 100 of FIG. 1. For example, if the outer shell 5 experiences a leak, seawater can invade the outer reinforcement layers 3 and 4 and can induce corrosion. Advantageously, the sensor 6B can detect and locate the point of water ingression and can be used to warn an operator to take preventative measure or schedule repairs. Similarly, if the internal reinforcement layer 1 experiences a leak of the fluids carried by the flexible pipe 100, the sensor 6A can detect and locate the leak and can be used to warn an operator to take preventative measure or schedule repairs. Accordingly, one or more of the exemplary sensors 6A and/or 6B can be employed depending on the application.

Figure 3:
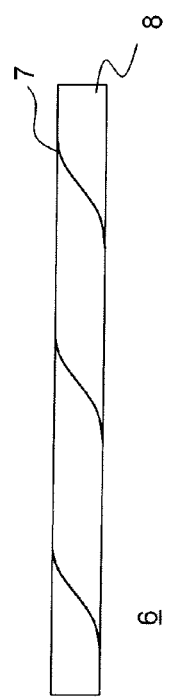
FIG. 3 illustrates an exemplary leak detection sensor, which can be the sensor of FIGS. 2A-2B, including an exemplary sensing fiber wrapped onto a material affected by the presence of a fluid (e.g., water, oil or gas)
Figure 4:
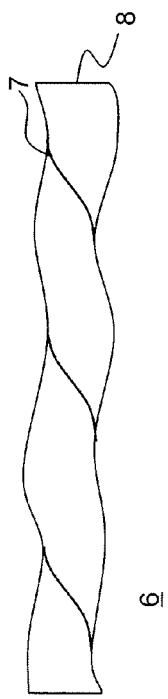
FIG. 4 illustrates the exemplary leak detection sensor of FIG. 3 after the material has increased in volume (e.g., swelled) due to the presence of the fluid, adding stress to the sensing fiber.
Figure 5A:
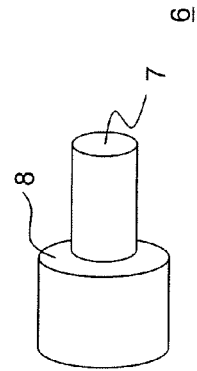
FIG. 5A illustrates a further exemplary embodiment of an exemplary leak detection sensor which can be the sensor used in FIGS. 2A-2B, including an exemplary material coating a fiber, wherein the material swells or contracts in the presence of the fluid, thereby changing the stress on the fiber.

FIG. 3 further illustrates an exemplary sensor 6A or 6B, including a sensing fiber 7 (e.g., an optical fiber, etc.) that is wrapped onto a material 8 that is affected by a fluid (e.g., water, oil, or gas, depending on the application). FIG. 4 illustrates the exemplary sensor 6A or 6B of FIG. 3, after the material 8 has increased in volume (e.g., swelled) due to the presence of the fluid, thereby adding stress to and changing the optical characteristics of the sensing fiber 7. FIG. 5A illustrates a further exemplary embodiment of the sensor 6A or 6B, wherein the material 8 is coated onto the fiber 7 and such material can change the stress on the fiber 7 when the material 8 is in the presence of a fluid (e.g., water, oil, gas, depending on the application). Although the exemplary sensor 6A or 6B are described in terms of measuring a change in stress in the sensing fiber 7 caused by the material 8, in further exemplary embodiments, the exemplary sensor 6A or 6B can be configured to employ the sensing fiber 7 that is made sensitive to other changes in the material 8. For example, the material 8 can be configured such that it reacts with the fluid to be detected, creating a species that can affect the sensing fiber 7 reading, wherein such change in sensing fiber 7 reading can be caused by a change in temperature, chemical attack, attenuation or stress, and the like.

Figure 5B:
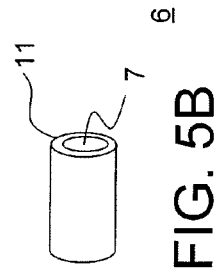
FIG. 5B illustrates a further exemplary embodiment of an exemplary leak detection sensor which can be the sensor of FIGS. 2A-2B, including a coating or surface provided on a fiber which changes the characteristics of the fiber in the presence of the fluid.

In further exemplary embodiments, the sensor 6A or 6B configured as the optical fiber 7 can be modified to make the fiber 7 sensitive to fluids (e.g., water, oil, gas, depending on the application). For example, as shown in FIG. 5B, this can be achieved by providing a coating (or a surface) 11 on the optical fiber 7, thereby making the fiber sensitive to various fluids, such as water, gas, oil, and the like. For example, an employed polymer material, such as acrylate or polypropylene can swell in the presence of water or oil, providing a strain to the fiber 7. This strain can then be detected using any suitable methods, such as the use of fibre Bragg gratings, interferometers, Brillouin scattering, attenuation due to micro or macro bending, and the like. Accordingly, imparting sensitivity to the optical fiber 7 can modify its optical characteristics. This modification (or change) can be measured in any known manner, as summarized herein. Advantageously, such modification enables the optical fiber 7 to detect a leak of water, gas or oil into or out of the structure, without the use of intermediate materials, such as the material 8 of FIGS. 3-5A.

As will be appreciated by those ordinarily skilled in the relevant arts, the exemplary sensors 6A or 6B can be employed with any suitable material, e.g., material 8, that is affected by the presence of fluids, gases, and/or liquids, such as water, seawater, gas, oil, and the like. In a further exemplary embodiment, the role of the material 8 can be performed by the layer 2 or any other suitable layer of the structure 100 and used to change the stress on the sensor 6A (or 6B in the case of the other layers) configured as the fiber 7 embedded in the layer 2, when the layer 2, for example, increases or decreases in volume (e.g., swells or contracts) due to the presence of a fluid (e.g., water, oil, gas, depending on the application).

Advantageously, a change in stresses on the sensing fiber 7 due to the expanded material 8 or layer 2 (or any other suitable layers of the structure 100) or the coating 11 (or surface 11) and/or modification of optical characteristics of the optical fiber, can be used for locating and detecting a leak in the structure 100. For example, this can be done by using any suitable known techniques which can measure the change in stress and the corresponding changes in the optical characteristics of the sensing fiber 7, including distributed (e.g., using optical frequency domain reflectometry) or multipoint sensor techniques, detection of change in attenuation or index of refraction of the optical fiber 7, optical time domain reflectometer (OTDR) or frequency domain techniques for detecting changes in the optical fiber 7, optical interferometer techniques, Brillouin, Raman or Rayleigh scattering, or a fiber Bragg grating techniques, and the like. Such techniques enable the detection of and the determination of the location of the leak. In one embodiment, the Bragg grating can be suitably designed so that it can detect and measure the change in the strain of the fiber 7 or of the change in the strain of the material around which the fiber 7 is wrapped or embedded.

In an exemplary embodiment, the material 8 can include any suitable material that deforms in shape (e.g., swells or contracts) due to the presence of (e.g., contact with) a fluid (e.g., water, oil, gas, depending on the application), such as any suitable metals, ceramic, gel, plastics, polymers (e.g., acrylate or polypropylene for water), polypropylene or acrylate (e.g., for oil), and the like. For example, the sensor 6A or 6B can include the optical fiber 7 that is wound around a polymer layer 8 (FIG. 3) or embedded in a polymer layer 8 (FIG. 5A), which deforms in the presence of a fluid, such as water or oil. In one embodiment, the sensor is wound around a material, such as a polymer, with a pitch of less than 70 layer diameters.

In further exemplary embodiments, the novel leak detection system of FIGS. 1-5, including the at least one sensor can be used in known pipe-in-pipe structures. Such structures usually include thermal insulation, such as foam, placed in an annular area between two pipes, with each of the two pipes forming an impermeable barrier to a fluid. Advantageously, a sensor, based on the exemplary embodiments of FIGS. 1-5, placed in the annular area can detect the presence and location of a leak or leaks in such pipe-in-pipe structures.

In a further embodiment, at least one sensor, based on the exemplary embodiments of FIGS. 1-5, can be embedded in a composite material, which can be placed in a space defined by two impermeable barriers (e.g., in a flexible pipe, a riser, an umbilical or in a pipe-in-pipe structure) to detect a leak.

Figure 7:
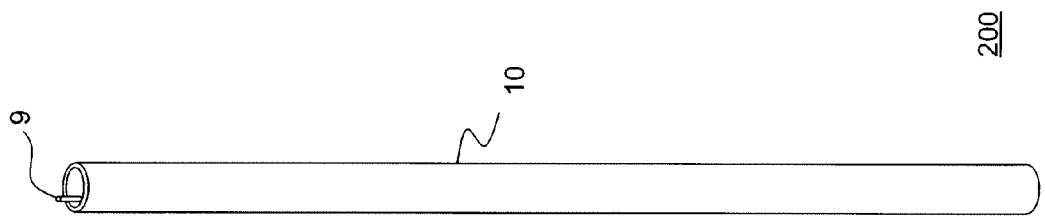
FIG. 7 illustrates an exemplary sensing fiber embedded into a pipe, such as a flexible pipe, to make temperature, vibration and strain measurements thereon.
Figure 6:
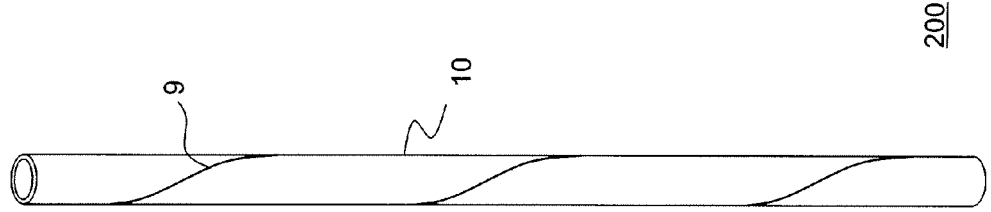
FIG. 6 illustrates an exemplary sensing fiber wrapped onto a pipe, such as a flexible pipe, to make temperature, vibration and strain measurements thereon.

In further exemplary embodiments, distributed temperature, vibration, and strain measurements, based on the exemplary embodiments of FIGS. 1-5, can be performed along the structure, for example, a flexible pipe, such as a flexible riser, or an umbilical, using optical fibers to detect leaks, ruptures or impacts that can affect the integrity of the flexible riser. For example, the optical fibers can be used for distributed temperature (T) measurements, distributed strain measurements (e.g., using Brillouin scattering), distributed vibration measurement (e.g., using Raleigh scattering), and the like. In an exemplary embodiment, as shown in FIGS. 6-7, such an exemplary sensing system 200 can include one or more optical fibers 9 deployed along a flexible riser 10 either in an internal structure of the flexible riser 10, as shown in FIG. 7, or strapped on or wrapped around the outside of the flexible riser 10, as shown in FIG. 6. Such fibers 9 can be connected to a surface unit (e.g., OTDR, etc., not shown) for distributed temperature, vibration, and strain measurements, and the like, performed in any known manner.

Advantageously, such measurements by the exemplary sensing system 200 can be used for leak detection. For example, if fluid starts leaking from the riser 10, which may be submerged in water, the riser will undergo an instant pressure change from the flow line internal pressure to the pressure of the water surrounding the riser. Such depressurization process generates acoustic waves due to the decompression of the fluid, as well as temperature changes (e.g., based on the Joule-Thompson effect in the case of a gas leaking from the riser). Accordingly, the distributed temperature and vibration measurements using the fiber 9 coupled to the surface unit can be used to detect where the leak is coming from on the riser 10 in any known manner.

In the case of impact detection, if an object (e.g., fishing net, etc.) impacts the riser 10, distributed strain and vibration measurements using the fiber 9 coupled to the surface unit can be used for detection of the impact and its location in any known manner. Distributed strain measurements using the fiber 9 coupled to the surface unit can be used for the detection of damage through the detection of permanent deformation after the impact in any known manner.

In the case of breakage of internal armor of the riser, excessive loading, corrosion or fatigue issues on the flexible riser 10 can cause internal structure thereof to be damaged and eventually break. For example, potential damages can be on the pressure vault and on the tensile armor of the flexible riser 10, wherein a break in the pressure vault or tensile armor generates noise that propagates along the flexible riser 10. Distributed vibration measurements using the fiber 9 coupled to the surface unit can be used for the detection of the area where the damage has taken place in the coating or surface on the sensors in any known manner.

Although the exemplary embodiments are described in terms of the structure 100 and 200 and the flexible riser 10, the exemplary embodiments can be applied to any suitable structures, such as pipes, pipes in pipes, integrated production bundles, offloading pipes, jumpers, risers, umbilicals, Christmas trees, flexible pipes, manifolds, control units, well heads, pieces of subsea equipment, and the like, as will be appreciated by those of ordinary skill in the relevant art(s).

Although the exemplary embodiments are described in terms of the exemplary sensors being sensitive to changes in stress, e.g., caused by a material or materials whose property or properties change when contacted with gas or liquid, the sensors (or sensors' reading) may be made sensitive to other changes in the material used, such as at least one property that changes in the presence of a liquid or gas. For example, the material, such as a polymer, or a composite material, could be such that it reacts with the fluid to be detected creating a species that could affect the fibre sensor reading. This change in sensor reading could be caused by a change in temperature, chemical attack, attenuation or stress among others. Similarly, the sensors (or sensors' reading) could be made sensitive to changes other than stress, in the material of the sensors, such as the coating or surface on the sensors. Thus, the material of the sensors, e.g., the coating or surface, may react with the fluid to be detected, e.g., liquid or gas, creating a species that can affect the sensor or the material, e.g., the coating or surface on the sensors. The change in sensor reading could be caused by a change in one or more property, such as a change in temperature, chemical attack, attenuation or stress.

Further, the at least one property that changes in the presence of liquid or gas includes one or more of deformation, swelling, shrinking, dissolution, cracking, rupture, heating, cooling, softening, hardening, and chemical reaction.

The present invention includes recognition that oil or gas leakage from oil or gas-transporting conduits (e.g., pipelines) is a significant problem in terms of both the capital loss and the potential hazards presented. Unfortunately, the locations and detection of oil or gas leaks sources are very difficult to pinpoint. As such, techniques for detecting leaks from gas or oil pipelines, involve detecting the acoustic signals (e.g., sound/vibrations) created by the gas or oil escaping through an orifice in the pipeline.

Accordingly, exemplary embodiments of the present invention are directed towards novel techniques for detecting oil or gas leaks by monitoring of such acoustic signals. For example, exemplary embodiments of the present invention provide an optical fiber sensor for applications in monitoring of conditions, such as leak detection in terrestrial oil or gas and oil pipelines. Amongst other functions, the exemplary system described with respect to FIGS. 1-7 enables the detection and location of leaks in such pipelines, as described above. Another method of detection and location of leaks in such pipelines is via measurement of the localized cooling (or heating) arising from the presence of a leak (of high-pressure oil or gas or hot oil respectively), which can be conducted with any known apparatus and method, e.g., thermocouples, distributed temperature sensors (DTS) Brillouin Optical Time-Domain Reflectometer (BOTDR) or Fiber Bragg Gratings (FBG) or other discrete optical fiber temperature sensors). Another method involves monitoring the acoustic signature of a leak. There are advantages to the pipeline operator in being able to estimate the size of a leak, and also in the reduced likelihood of false alarms, through the use of two or more independent detection mechanisms.

Exemplary embodiments of this invention utilize detection and measurement of acoustic emissions (and in particular the characteristic frequencies emitted) from, for example, high pressure oil or gas pipeline leaks, to enable estimates of the leak flow rates. In this respect, oil or gas leaks are expected to give rise to acoustic emissions having characteristic frequencies, dependent upon factors such as:

- oil or gas pressure and composition;
- pipe bore diameter;
- leak orifice diameter and shape/profile; and/or
- backfill properties (e.g., including depth of backfill, permeability, particle size distribution, moisture content, material composition etc.)

The monitoring of the acoustic signature of the leak, to detect the location and estimate the leak flow rates can be carried out with an optical fiber configured as a distributed interferometer. Thus, embodiments of the present invention include developing Coherent Rayleigh Noise ("CRN") in the fiber optic sensor, configured as a distributed interferometer, and processing the developed CRN in the fiber optic sensor to provide for monitoring the conduits. CRN may be generated in the fiber optic sensor by injecting a coherent beam of electromagnetic radiation into the fiber optic sensor, wherein the coherent beam and the fiber optic sensor are configured to provide for interference effects of the backscatter in the fiber optic at a detection point. The interference effects in the backscatter from the fiber optic sensor at a detection point may be provided by configuring the length of the fiber optic to be shorter than a coherence of the source producing the beam, by configuring the coherent beam as a pulse of the coherent electromagnetic radiation having a pulse duration equivalent to or shorter than a coherence length of the source producing the pulse of the coherent electromagnetic radiation and the like. The optical fiber sensor or sensors configured as distributed interferometer may be the sensors of the exemplary system described above in connection with FIGS. 1-7.

Alternatively, the exemplary system of FIGS. 1-7 may be operated as described above to detect and locate a leak, rupture or impact in a structure, and a separate optical fiber, configured as a distributed interferometer, may be included to monitor acoustic signature of the leak as a distributed interferometer.

Figure 8:
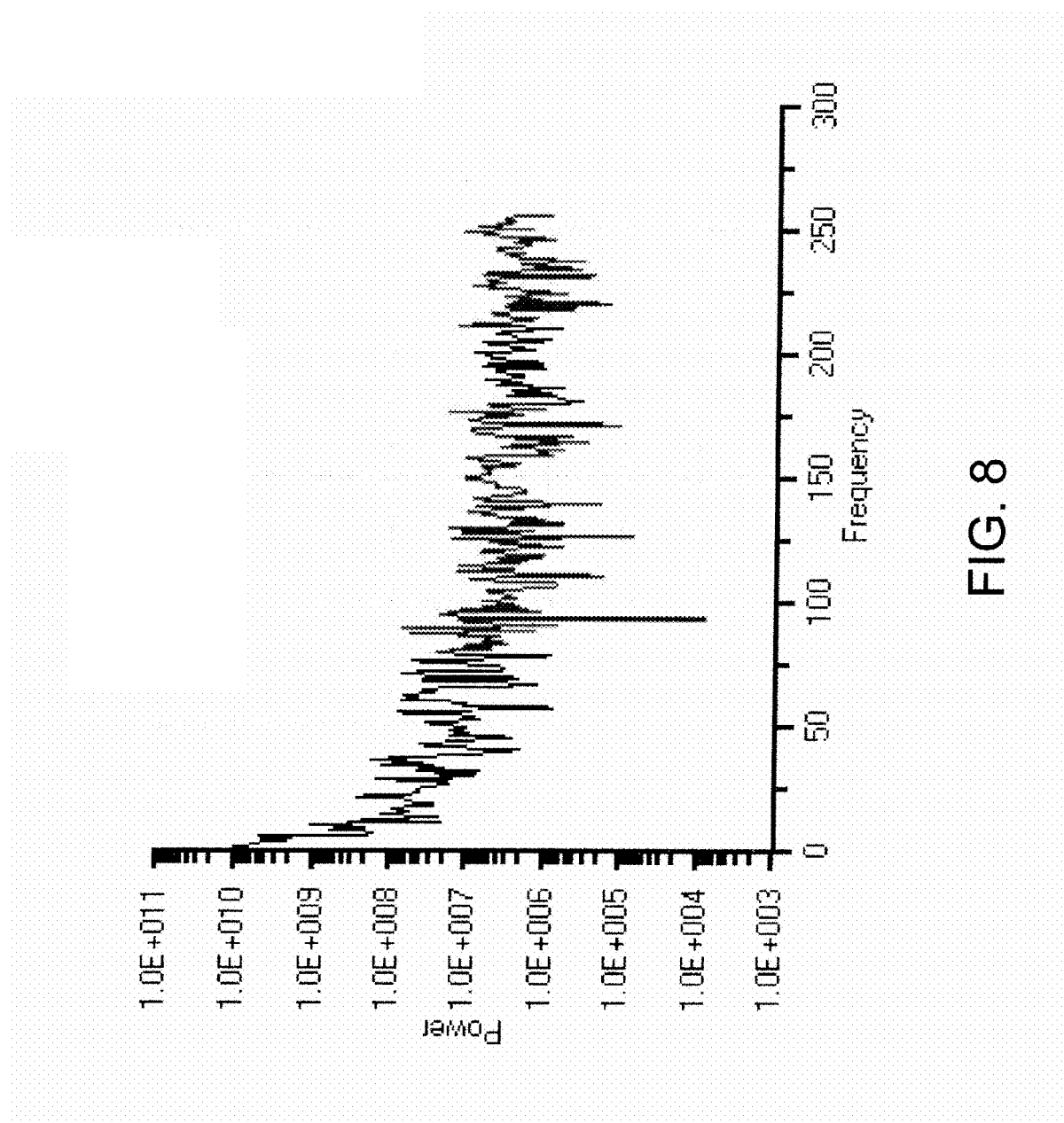
FIG. 8 illustrates an exemplary Coherent Rayleigh Noise (CRN) Spectrum for a pipe structure having no leak.

Small-scale oil or gas leak trials have been performed, wherein in addition to instrumentation with thermocouples and distributed temperature sensors (DTS), the oil or gas leak was monitored with the fiber optic sensors of the exemplary system described above with conjunction with FIGS. 1-7, configured as Coherent Rayleigh Noise (CRN) sensors, which are sensitive to dynamic strain/vibration and thermal changes at frequencies up to, for example, 250 Hz. Generally, useful frequencies include seismic frequency range 0.1 Hz to 400 Hz, acoustic frequency range 10 Hz to 10,000 Hz, and the like. For example, FIG. 8 shows the acoustic spectrum collected in the region of the leak before the oil or gas leak occurred and which can be regarded as a background measurement. When the oil or gas leak was generated (e.g., oil or gas pressurized at 100 bar, released through a 1 mm orifice in the pipe wall), the acoustic spectrum shown in FIG. 9 was recorded.

Figure 9:
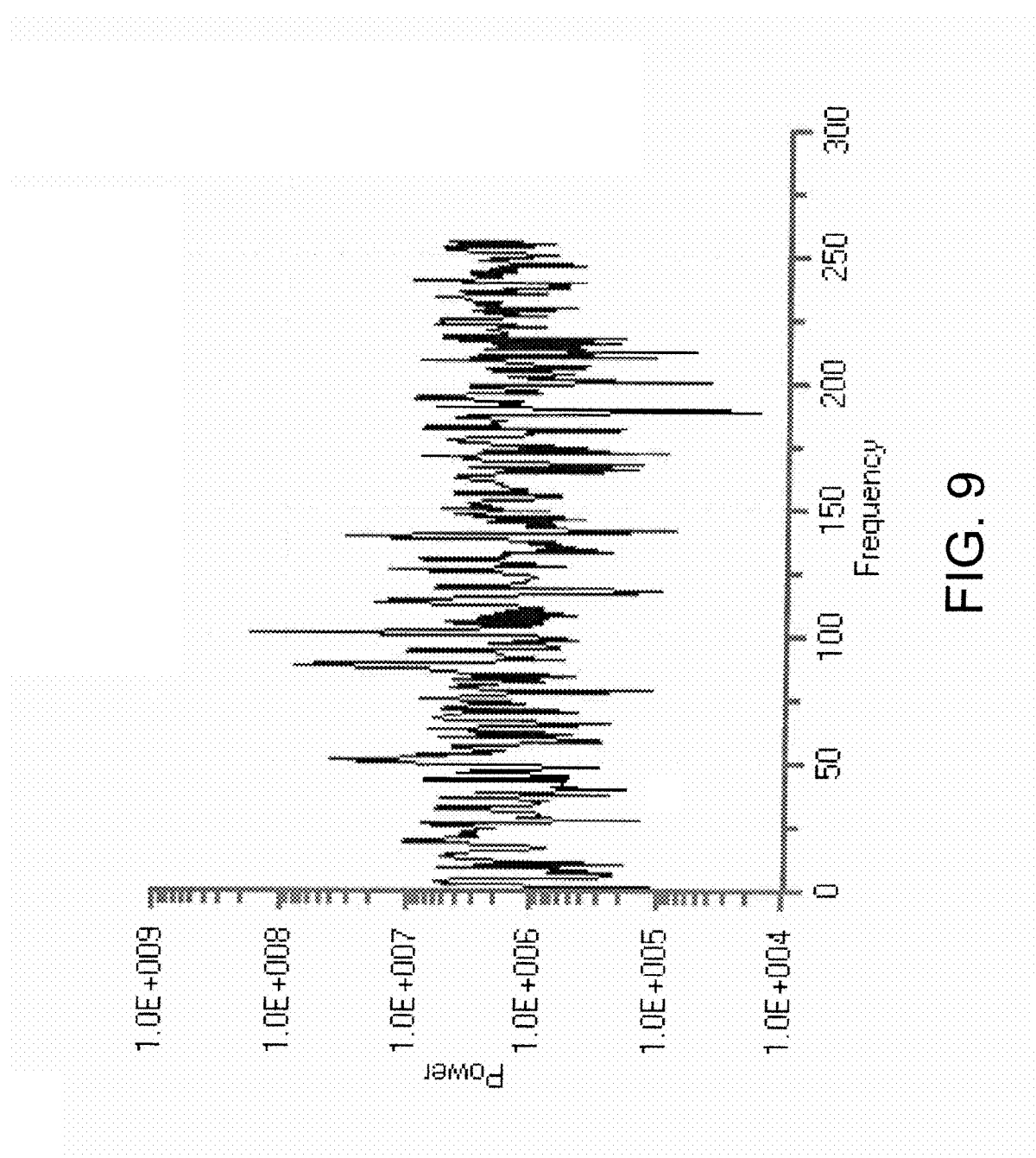
FIG. 9 illustrates an exemplary Coherent Rayleigh Noise (CRN) Spectrum for the pipe structure of FIG. 8 having an oil or gas leak.

From FIG. 9, it is noted that of interest are the strong acoustic signals at 100 Hz and 88 Hz (amongst other harmonics). These characteristic frequencies vary according to the factors outlined above. In pipeline installations, most of the factors (e.g., such as oil or gas pressure, composition, pipe diameter) would be known; others (e.g., backfill properties) will be understood to a reasonable degree, leaving the principal unknown variable as the orifice diameter (and e.g., shape/profile of the orifice).

The exemplary embodiments of this invention include a technique of measuring the characteristic frequencies of the acoustic emissions from a fluid leak, and using this data in an acoustic model to estimate the orifice diameter and hence the leak rate. The technique of using acoustic emission to determine aperture size is well understood in the field, for example, as further described in Jingyan et al., 9$^{th}$ International conference on Control, Automation, Robotics and Vision (ICARCV), Dec. 5-8, 2006, pages 1-5, incorporated by reference herein.

The system and method described herein may be used to monitor conduits which are used in subsea exploration and conduits placed on surface of the earth or buried underground. Thus, the system and method may be used with conduits which contain any liquids and/or gases, e.g., water, carbon dioxide, natural gas, oil or any combination thereof.

This principle of leak rate modeling based on acoustic emissions is coupled with information on localized rate of cooling by DTS (or, alternatively, by Brillouin Optical Time-Domain Reflectometer (BOTDR)) for an improved estimate, as well as providing verification of the existence of a leak by more than one independent detection mechanisms.

While the inventions have been described in connection with a number of exemplary embodiments, and implementations, the inventions are not so limited, but rather cover various modifications, and equivalent arrangements, which fall within the purview of the appended claims.

What is claimed is:

1. A leak detection system for a structure, the system comprising:
    a structure having a first barrier to a first fluid and a second barrier to a second fluid, the first barrier and the second barrier defining a space therebetween; and
    at least one sensor, placed in the space, and configured to detect presence of the first fluid or the second fluid in the space due to a leak in the first barrier or the second barrier;
    wherein the fluid leak produces an acoustic emission, and the at least one sensor comprises a fiber optic sensor configured to measure one or more characteristics of the acoustic emission, and the system is configured to estimate the dimensions of the fluid leak based on the measured one or more characteristics, and to calculate a leak rate based on the estimated dimensions.

2. The system of claim 1, wherein the at least one sensor comprises at least one Fiber Bragg Grating.

3. The system of claim 1, wherein the at least one sensor is based on Brillouir, Raman or Rayleigh scattering.

4. The system of claim 1, wherein the at least one sensor employs at least one optical interferometer.

5. The system of claim 1, wherein the structure is at least partially an underwater structure or an underground structure.

6. The system of claim 1, wherein the at least one sensor is imbedded into a polymer that has at least one property that changes in the presence of a liquid or gas.

7. The system of claim 1, wherein the at least one sensor is an optical fiber sensor that is wound around a polymer layer that has at least one property that changes in the presence of a liquid or gas and with a pitch of less than 70 layer diameters.

8. The system of claim 1, wherein the at least one sensor is imbedded in a composite material that has at least one property that changes in the presence of a liquid or gas.

9. The system of claim 1, wherein the at least one sensor is imbedded into a material that has at least one property that changes in the presence of a liquid or gas or is placed on or under a polymer layer that has at least one property that changes in the presence of a liquid or gas.

10. The system of claim 1, wherein
    the system is configured to estimate the orifice diameter of the fluid leak.

11. The system of claim 1, wherein the at least one sensor is imbedded into a polymer layer.

12. The system of claim 1, wherein the at least one sensor detects the presence of at least one of water, oil, and gas.

13. The system of claim 1, wherein the at least one sensor is placed under an outer shell of the structure to detect leaks of sea water into the structure.

14. The system of claim 1, wherein the at least one sensor is placed between the two barriers to sense a leak of oil or gas out of the structure or to sense a leak of a fluid into the structure through an external wall of the structure.

15. The system of claim 1, wherein the structure is a pipe, a pipe in pipe, a riser, an umbilical, a flexible pipe, an integrated production bundle, and offloading pipe, a jumper, a manifold, a control unit, a well head or subsea equipment.

16. The system of claim 1, wherein at least one of the first barrier or the second barrier is one of a polymer layer, a metal layer, an insulation layer, a pipe, a buoyancy layer.

17. The system of any one of claim 6, 8, 9 or 7, wherein the property change includes at least one of deformation, swelling, shrinking, dissolution, cracking, rupture, heating, cooling, softening, hardening, and chemical reaction.

18. The system of claim 17, wherein the at least one sensor is a Coherent Rayleigh Noise (CRN) sensor.

19. The system of claim 17, further comprising distributed temperature sensors (DTS) for determining localized rate of cooling or heating based on the fluid leak, wherein the system is configured to employ the leak rate calculation based on acoustic emissions along with the localized rate of cooling or heating determined by the DTS.

20. The system of claim 17, further comprising a Brillouin Optical Time-Domain Reflectometer (BOTDR) for determining localized rate of cooling or heating based on the fluid leak, wherein the system is configured to employ the leak rate calculation based on acoustic emissions along with the localized rate of cooling determined by the BOTDR.

21. A leak detection method for a structure having a first barrier to a first fluid and a second barrier to a second fluid, the first barrier and the second barrier defining a space therebetween, the method comprising:
- placing at least one sensor in the space to detect presence of the first fluid or the second fluid in the space due to a leak in the first barrier or the second barrier; and
- detecting with the sensor the presence of the first fluid or the second fluid in the space due to a leak in the first barrier or the second barrier, wherein the fluid leak produces an acoustic emission, and the at least one sensor comprises a fiber optic sensor, the method further including the steps of:
- measuring with fiber optic sensor one or more characteristics of the acoustic emission;
- estimating the dimensions of the fluid leak based on the measured one or more characteristics; and
- calculating a leak rate based on the estimated dimensions.

22. The method of claim 21, wherein the at least one sensor comprises at least one Fiber Bragg Grating.

23. The method of claim 21, wherein the detection step is based on Brillouin, Raman or Rayleigh scattering.

24. The method of claim 21, wherein the at least one sensor employs at least one optical interferometer.

25. The method of claim 21, wherein the structure is at least partially an underwater structure or an underground structure.

26. The method of claim 21, wherein the at least one sensor is imbedded into a polymer that has at least one property that changes in the presence of a liquid or gas.

27. The method of claim 21, wherein the at least one sensor is imbedded in a composite material that has at least one property that changes in the presence of a liquid or gas.

28. The method of claim 21, wherein the at least one sensor is imbedded into a material that has at least one property that changes in the presence of a liquid or gas or is placed on or under a polymer layer that has at least one property that changes in the presence of a liquid or gas.

29. The method of claim 21, wherein the at least one sensor is an optical fiber sensor that is wound around a polymer layer that has at least one property that changes in the presence of a liquid or gas and with a pitch of less than 70 layer diameters.

30. The method of claim 21, wherein the at least one sensor is imbedded into a polymer layer.

31. The method of claim 21, wherein the at least one sensor detects the presence of at least one of water, oil, and gas.

32. The method of claim 21, wherein the at least one sensor is placed under an outer shell of the structure to detect leaks of sea water into the structure.

33. The method of claim 21, wherein the at least one sensor is placed between the two barriers to sense a leak of oil or gas out of the structure or to sense a leak of a fluid into the structure through an external wall of the structure.

34. The method of claim 21, wherein the structure is a pipe, a pipe in pipe, a riser, an umbilical, a flexible pipe, an integrated production bundle, and offloading pipe, a jumper, a manifold, a control unit, a well head or subsea equipment.

35. The method of claim 21, wherein;
- estimating the dimensions of the fluid leak comprises estimating the orifice diameter of the fluid leak.

36. The method of claim 35, wherein the at least one sensor is a Coherent Rayleigh Noise (CRN) sensor.

37. The method of claim 35, further comprising:
- providing distributed temperature sensors (DTS) and determining localized rate of cooling or heating based on the fluid leak with the DTS; and
- employing the leak rate calculation based on acoustic emissions along with the localized rate of cooling or heating determined by the DTS.

38. The method of claim 35, further comprising:
- providing a Brillouin Optical Time-Domain Reflectometer (BOTDR) for determining localized rate of cooling or heating based on the fluid leak; and
- employing the leak rate calculation based on acoustic emissions along with the localized rate of cooling determined by the BOTDR.

* * * * *